United States Patent [19]

Knowlton

[11] 4,398,890
[45] Aug. 16, 1983

[54] REPRESENTATION OF DESIGNS

[76] Inventor: Kenneth C. Knowlton, 124 Ferne Ave., Palo Alto, Calif. 94306

[21] Appl. No.: 243,822

[22] Filed: Mar. 16, 1981

[51] Int. Cl.³ .............................................. G09B 29/00
[52] U.S. Cl. ..................................................... 434/96
[58] Field of Search .................. 434/81, 96, 107, 150, 434/83; 273/157 R, 293, 295; 283/1 A, 34; 5/451

[56] References Cited

U.S. PATENT DOCUMENTS

| | | | |
|---|---|---|---|
| 455,066 | 6/1891 | Stern | 273/156 |
| 1,492,671 | 5/1924 | Bruel | 434/96 |
| 1,777,622 | 10/1930 | O'Hare | 400/103 |
| 2,618,078 | 11/1952 | Weil | 434/96 |
| 3,002,309 | 10/1961 | Snyder | 434/96 X |
| 3,474,192 | 10/1969 | Webb | 358/283 X |
| 3,629,496 | 12/1971 | McConnell | 358/283 X |
| 3,833,222 | 9/1974 | Castanis | 273/293 X |
| 3,977,007 | 8/1976 | Berry | 358/283 X |
| 3,987,558 | 10/1976 | Tsukamoto | 434/96 |
| 4,266,249 | 5/1981 | Chai | 358/138 |

FOREIGN PATENT DOCUMENTS

| | | | |
|---|---|---|---|
| 1568776 | 4/1969 | France | 273/157R |
| 94373 | 6/1969 | France | 273/157 R |

OTHER PUBLICATIONS

K. Knowlton et al., "Computer Produced Grey Scales", Computer Graphics and Image Processing, vol. 1, No. 1, Apr. 1972, pp. 1-20 Sci. Lib.

*Primary Examiner*—William H. Grieb
*Attorney, Agent, or Firm*—George E. Kersey

[57] ABSTRACT

Representation of designs using pattern members such as domino pattern blocks. The design is subdivided into a plurality of subordinate areas which are assigned values in accordance with a prescribed characteristic such as brightness. The assigned values are coordinated with those of the pattern members which are then substituted into the subordinate areas to realize the desired patterned representation of the design.

11 Claims, 10 Drawing Figures

REPRESENTATION OF DESIGNS

BACKGROUND OF THE INVENTION

This invention relates to the representation of designs, and, more particularly, to the representation of designs using pattern members, such as pattern blocks.

Many designs appear at normal viewing distances to be continuous renditions of color or shades of color. In fact, at every point, when the design is examined closely, it is formed by discreet elements of color, typically black or white or some combination of spectral components in the case of color photographs.

The half-tone process used for reproducing photographs in newspapers makes use of a fine black-white checkerboard to represent mid-range gray. Different sizes of white spots on a black background or black spots on a white background are used for other shades of gray.

Representations of continuous designs may be made in other ways as well. Thus, small patterns or symbols originally designed for other purposes can be used to produce a photographic effect, if the patterns or symbols are relatively small in comparison with the overall size of the picture and if they permit selection of the desired brightness level in the space occupied by the pattern or symbol.

Accordingly, pictures can be produced by ordinary typewriter characters so that even when the individual type characters are quite unrelated to an overall scene they can be combined to produce a meaningful macroscopic pictorial representation. This is because the eye of the viewer does not see the microstructure from a distance but instead perceives intermediate shades of coloration according to the ratio of coloration presented by the microstructural elements.

A detailed explanation of the use of structural elements to represent pictorial scenes is presented in "Computer Produced Grey Scales" by Ken Knowlton and Leon Harmon in *Computer Graphics and Image Processing*, Volume 1, No. 1, April 1972, pages 1 through 20.

While a wide variety of symbolic elements are available for use in representing designs, certain elements create special problems. Thus a die has only a limited number of representations. In particular a die has six sides with from one to six spots of one color on a background of a different color. Thus the use of a die as a pattern member can pose difficulties since the number of different picture elements is strictly limited. A similar limitation is presented by the domino. The sets available are called double-sixes, double-nines or double-twelves. The double-six includes all combinations from blank-blank to six-six. This is because each individual domino is made up of two areas, side by side, each of which may be blank or contain a number of spots. In the case of a six-six, each area contains six spots. Similarly the double-nine set contains all combinations up to nine-nine and the double-twelve set contains all combinations up to twelve-twelve. The dominoes pose special problems as picture elements since each includes two areas which are side by side. It is not enough to satisfy the constraints of one of the areas. If each domino is to be used as an integral member two pattern areas are used for each member placement.

Accordingly, it is an object of the invention to facilitate the representation of designs using patterned blocks. A related object is to facilitate the representation of designs using pattern members in the form of blocks which include marks of one color on a background of another color.

It is another object of the invention to achieve picture quality representation of designs using spotted pattern blocks. A related object is to use spotted pattern blocks in the form of dice and dominoes.

It is a further object of the invention to represent designs using pattern blocks containing multiple patterns, such as dominoes. A related object is to represent designs using game pieces which can be used in conventional gaming fashion once they have served their design purpose.

Still another object of the invention is to achieve the representation of designs using complete sets of pattern blocks. A related object is to represent designs using complete sets of dominoes, such as a specified plurality of a double-six, double-nine or a double-twelve set.

SUMMARY OF THE INVENTION

In accomplishing the foregoing and related objects, the invention provides a method of representing a design by pattern members, such as sets of dominoes, by subdividing the design into a plurality of subordinate areas; assigning a value to each subordinate area in accordance with the prescribed characteristic; coordinating the assigned values with the values of the pattern members; and substituting the coordinated pattern members into the sub-areas. The result is a pattern representation, for example by a plurality of complete sets of dominoes, of a prescribed design.

In accordance with one aspect of the invention the prescribed characteristic in accordance with which a value is assigned to each subordinate area, is brightness. In general terms brightness refers to the spectral intensity of the area. In specific terms it refers to the amount and nature of light absorbed or reflected by an area. In black and white terms brightness is at a maximum for an area which is white and is at a minimum for an area which is black. Brightness is at an intermediate level for the graduations of gray which exist between black and white.

In accordance with another aspect of the invention the brightness level of a sub-area represents the composite value of the brightness characteristics associated with the various parts of the sub-area. Thus, an area which contains black and white sub-elements will nevertheless have an intermediate gray level to which an assigned value can be given. Similar considerations apply to other monochromatic colors, and polychromatic representations can be treated on the basic of appropriate combinations of their monochromatic constituents.

In accordance with another aspect of the invention, the number of brighness levels assigned to the various subordinate areas of the design exceeds the number of values of pattern members. Thus, in the case of dominoes which have areas with ten brightness levels, ranging from black for a blank area to a value of ten for an area with nine spots (a blank having a value of one) the number of original levels may exceed ten. In one embodiment, it is convenient to use thirty-six brightness levels but in general the brightness levels could be about ten-fold the maximum value of any pattern member so that a preferred embodiment could make use of possibly 100 brightness levels in the cae of a double-nine set of dominoes. Similar considerations apply to other sets of dominoes, as well as to other forms of pattern members.

In accordance with another aspect of the invention, the values assigned to the subordinate areas are evaluated to produce a suitable fit with the pattern members. One technique for accomplishing the evaluation is to consider the subordinate areas in pairs. If two horizontal pairs are initially chosen the same areas are also considered as vertical pairs. The evaluation is made in terms of optimizing a characteristic such as "pair unbalance". One measure of unbalance is given by the absolute value of the difference in brightness levels of adjoining sub-areas. If the sum of unbalances for horizontally adjoining areas is not as great for a specified subordinate area as that for vertically constituted subordinate areas, the latter is chosen. The subordinate areas that are evaluated can be any multiple of pair areas. In one embodiment of the invention, two- and three-pair areas are taken as the evaluated subordinate area with two of the pair areas extending in one direction, i.e. horizontal or vertical, and the (optional) third area extending in the other direction.

In accordance with a further aspect of the invention, the coordinated pattern members are substituted for the subordinate areas by assigning all of an a priori given collection of pattern members such as an integral number of complete sets of dominoes.

DESCRIPTION OF THE DRAWINGS

Other aspects of the invention will become apparent after considering several illustrative embodiments taken in conjunction with the drawings in which.

DETAILED DESCRIPTION

Figure 1A:
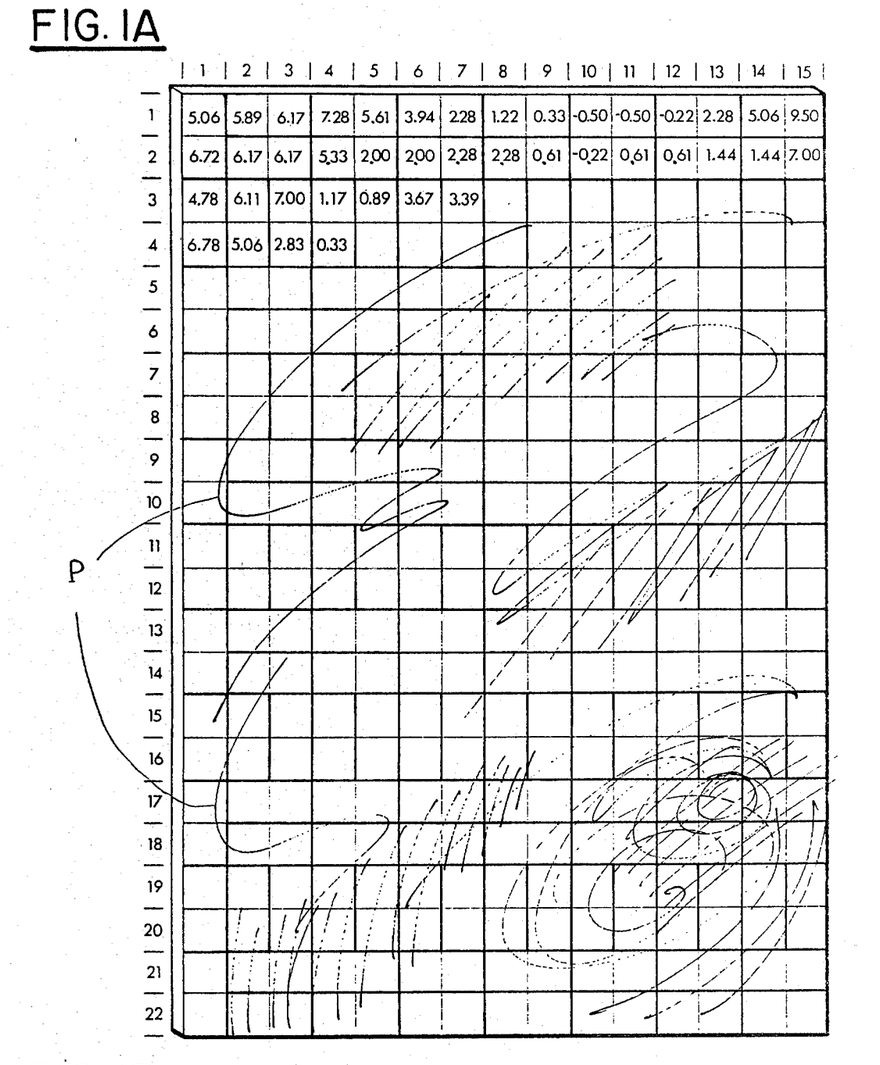
FIG. 1A is a quantized representation of a photograph which is to be represented by three complete sets of double-nine dominoes.

With reference to the drawings, FIG. 1A shows, in part, the result of representing a photograph P by three hundred and thirty picture elements or cells, each in the form of a square, in a grid that is fifteen elements wide and twenty-two elements high. It will be appreciated that the picture P in FIG. 1A is completely fanciful, and that in ordinary practice the picture P has a prescribed pattern.

The cells are, illustratively, to be organized so that the photograph can be represented by dominoes. Since each domino consists of two cells with zero to nine dots in each cell, the values used in the cells have been adjusted to range between −0.5 and +9.5. The intent is that the ideal representation will be the nearest integer in number of dots: 0, 1, 2 . . . 8,9.

With the value of each picture element or cell selected on a scale from −0.5 to +9.5, −0.5 indicates total darkness and +9.5 indicates white. The intermediate values represent an average of the lightness and darkness. Thus, a level of 4.5 at the middle of the range represents a gray scale where the darkness is balanced by the lightness to produce an intermediate gray visual effect.

The cell values are further arranged by "histogram leveling", a wellknown general procedure for the redistribution of data, to have a relatively uniform distribution throughout the range from −0.5 to +9.5. A histogram is defined graphically as a representation of a frequency distribution by rectangles whose widths represent class intervals and whose heights represent corresponding frequencies. When the brightness is measured to the nearest hundredth, this range provides 1,000 levels. It will be understood that 100 levels are also adequate and that the corresponding range is from −0.5 to +9.5.

The representation is to be made using dominoes. Since each domino has two areas, the picture elements of FIG. 1A are grouped in pairs.

The initial representation, i.e. "tiling" of pairs is with a left-edge strip of vertical pairs. The term "tiling" refers to the fact that the domino pairs are arranged in a pattern much in the way that tiles are arranged. The remaining pairs in the tiling are in alternate horizontal and vertical groups. Thus, the second and third elements in the first two rows constitute a horizontal pair, along with the remaining pairs in the first two rows. Similarly, elements 2 and 3 in the next pair of rows constitute a vertical pair, along with the remaining elements in those rows. In the fifth and sixth rows, the first rows are duplicated, etc.

Figure 1B:
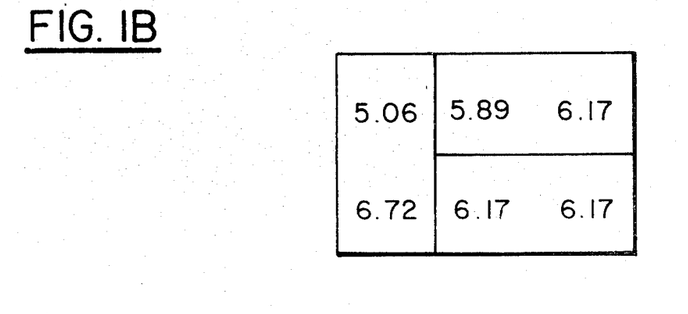
FIG. 1B is an enlarged view of the upper left hand corner of FIG. 1A.

The upper left hand corner of FIG. 1A has been enlarged and reproduced in FIG. 1B. The vertical cell pair is shown with picture values of 5.06 and 6.72. The value 5.06 corresponds to slightly lighter than mid-level of 4.50. The value 6.72 is approximately midway between 4.50 and 9.50.

The representation is to be made using three complete sets of double-nine dominoes. Each double-nine set contains fifty-five dominoes since it ranges from double blank through the double nine or is, in effect one half of a matrix with ten columns and ten rows so that the total number is (10÷2)×(1+10) or 55.

Accordingly the total number of dominoes in three sets is 165. Since each domino has two areas the total number of picture elements in three sets of dominoes is 330 or the same number shown in FIG. 1A.

The 330 values for FIG. 1A are set forth in Table I as follows:

TABLE I

| rows | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 5.06 | 5.89 | 6.17 | 7.28 | 5.61 | 3.94 | 2.28 | 1.22 | 0.33 | −0.50 | −0.50 | −0.22 | 2.28 | 5.06 | 9.50 |
| 2 | 6.72 | 6.17 | 6.17 | 5.33 | 2.00 | 2.00 | 2.28 | 2.28 | 0.61 | −0.22 | 0.61 | 0.61 | 1.44 | 1.44 | 7.00 |
| 3 | 4.78 | 6.11 | 7.00 | 1.17 | 0.89 | 3.67 | 3.39 | 3.39 | 3.67 | 3.39 | 0.61 | 1.44 | 2.28 | 1.72 | 3.67 |
| 4 | 6.78 | 5.06 | 2.83 | 0.33 | 4.78 | 7.56 | 8.11 | 8.67 | 8.94 | 8.67 | 6.17 | 3.67 | 3.11 | 3.39 | 3.39 |
| 5 | 8.39 | 8.39 | 0.61 | 6.72 | 8.94 | 8.67 | 8.94 | 8.67 | 8.11 | 7.56 | 7.56 | 5.61 | 3.39 | 5.33 | 5.06 |
| 6 | 9.50 | 8.67 | 1.44 | 7.56 | 8.11 | 9.50 | 9.50 | 8.67 | 9.22 | 8.39 | 8.39 | 8.67 | 2.00 | 3.39 | 4.22 |
| 7 | 8.94 | 4.22 | 3.94 | 7.56 | 7.83 | 8.94 | 8.94 | 8.67 | 9.22 | 8.94 | 8.39 | 8.94 | 2.56 | 1.22 | 1.72 |
| 8 | 8.94 | 0.89 | 5.06 | 7.56 | 8.94 | 7.83 | 8.67 | 9.22 | 9.22 | 8.94 | 8.39 | 8.94 | 3.39 | 0.61 | 1.22 |
| 9 | 7.28 | −0.50 | 3.67 | 5.61 | 8.67 | 9.50 | 8.67 | 7.00 | 8.11 | 7.00 | 7.56 | 8.39 | 4.78 | 4.89 | 0.61 |
| 10 | 8.94 | 0.33 | 3.11 | 3.94 | 6.44 | 8.94 | 7.56 | 4.22 | 6.17 | 7.83 | 8.39 | 8.11 | 6.72 | 0.33 | 2.83 |
| 11 | 9.50 | 2.83 | 3.11 | 1.72 | 3.39 | 8.67 | 7.56 | 5.61 | 6.72 | 6.72 | 9.50 | 7.83 | 6.72 | 2.00 | 8.11 |
| 12 | 7.28 | 5.61 | 3.11 | 6.17 | 6.17 | 8.39 | 7.28 | 8.11 | 7.83 | 7.83 | 7.83 | 7.56 | 7.00 | −0.22 | 5.61 |
| 13 | 3.11 | 8.67 | 2.00 | 7.00 | 7.28 | 7.28 | 7.28 | 7.28 | 8.39 | 8.67 | 8.94 | 7.28 | 5.33 | 1.44 | 7.00 |
| 14 | 2.56 | 9.50 | 2.00 | 7.00 | 7.83 | 7.00 | 5.89 | 7.00 | 7.56 | 8.11 | 7.83 | 7.28 | 4.50 | 1.22 | 7.00 |
| 15 | 2.56 | 9.22 | 3.67 | 6.44 | 1.22 | 2.00 | 3.94 | 6.72 | 7.83 | 7.83 | 8.11 | 6.72 | 5.89 | 3.11 | 1.44 |
| 16 | 2.28 | 8.39 | 6.17 | 3.11 | 0.33 | 1.72 | 1.72 | 0.06 | 5.61 | 7.00 | 6.44 | 5.33 | 5.06 | 3.94 | 1.72 |
| 17 | 1.44 | 8.39 | 7.83 | 2.28 | 2.83 | 4.78 | 5.89 | 5.89 | 5.53 | 6.17 | 5.89 | 5.61 | 2.56 | 5.89 | 1.72 |
| 18 | 0.61 | 8.39 | 4.50 | 1.44 | 5.06 | 2.28 | 7.28 | 6.72 | 6.72 | 6.72 | 5.33 | 0.89 | 0.33 | 7.28 | 2.28 |
| 19 | 0.61 | 7.28 | 2.28 | 0.33 | 0.33 | 2.00 | 2.28 | 3.39 | 3.39 | 2.00 | 0.33 | 0.33 | 4.50 | 6.72 | 2.83 |
| 20 | 0.89 | 4.22 | 3.94 | 0.33 | −0.50 | −0.50 | −0.50 | −0.22 | −0.22 | 0.06 | −0.22 | 3.11 | 6.44 | 7.83 | 0.89 |
| 21 | 3.94 | 3.11 | 2.83 | 0.89 | −0.50 | −0.50 | −0.50 | −0.50 | −0.22 | 0.33 | 5.61 | 7.83 | 7.00 | 6.17 | 1.44 |
| 22 | 2.00 | 0.61 | 5.33 | 4.78 | 2.00 | 0.06 | −0.50 | −0.22 | 2.28 | 6.44 | 6.44 | 6.44 | 6.44 | 4.50 | 3.39 |

The number, size and arrangement of cells are such that two adjacent cells are to be covered by one domino (itself consisting of two cells of the same size, each having from zero to nine dots on its face). The range is from −0.5 to +9.5.

The complete set of pairings is called a "tiling". Tiling is effected throughout the picture shown that every cell is paired with one and only one adjacent cell. Each such pair of cells may be covered with one domino. Disregarding the brightness values of the picture cells and the number of spots on the domino cells, such tiling represents one geometric way of covering the picture area with dominoes.

Figure 2:
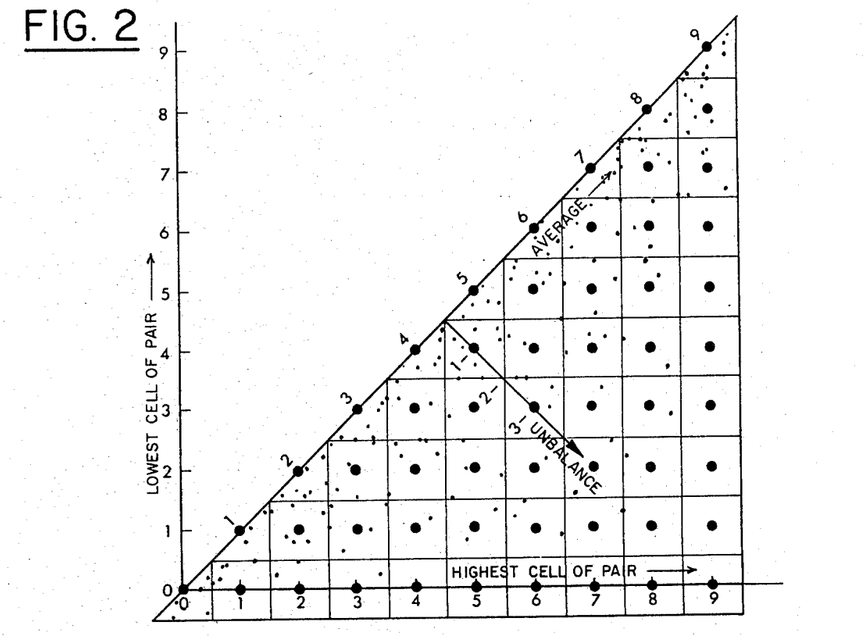
FIG. 2 is a plot of picture cell pairs on a triangular representation of domino kinds.

In addition, each pair of picture cells may be represented by a point somewhere in the triangular region of FIG. 2. The construction coordinates of each cell in FIG. 2 are the two picture cell values. If the values are equal, the point will be on the 45° diagonal. When, for example, the picture contains fifteen by twenty-two cells, there are exactly 165 such cell pairs. These are schematically represented by the 165 small dots in the triangle of FIG. 2.

Each pair of cells can be characterized by the "average" value of the two cells and by the "unbalance" of the pair. The latter refers to the highest minus the lowest value. These measurements are an additional or alternative set of coordinates for the plot of distribution of cell pairs as indicated in FIG. 2.

The invention provides a systematic way of assigning a given collection of dominoes with one domino to each picture cell pair, so as to represent light values of the original picture by domino dots on whole dominoes, i.e., pairs of areas. Since the dots on ordinary domino cells are of equal size, the larger the number of dots in a cell, the brighter the picture cell that such a domino cell would ideally represent.

Dominoes, for example, of a "double-nine" set, come in a discrete number of kinds, e.g. 0-0, 1-5, 6-9, etc., where the numbers for each kind stand for the number of dots in the two domino cells. As with pairs of picture cells, each kind of domino, for example 5-7, may be characterized by a high cell (e.g. 7), a low cell (e.g. 5), an average value (e.g. 6) and an unbalance (e.g. 2). Each kind of domino may thus be plotted as a position in the diagram of FIG. 2. There are exactly 55 kinds of dominoes in a double-nine set; they have been plotted as large dots.

The goal is to assign dominoes to cell pairs in such a way that each cell of each domino closely matches the value of the picture cell which it is to represent. In general there will be a mismatch for each identification of domino cell with picture cell. This may be taken to be, in value, the absolute value of the difference between the picture cell and the corresponding domino cell values. For each total representation of a picture by dominoes, it is possible to consider an overall badness of fit, which could, by way of example, be taken numerically to be the maximum mismatch, or the average mismatch, or the square root of the average of the squares of mismatches, etc.

With each collection of dominoes and a particular tiling of a particular picture, i.e, a complete set of pairings of picture cells, the objective is to make a good assignment of dominoes to picture cell pairs.

In general a fortuitous distribution of picture cell pairs will not be apparent. In particular, a typical picture, subjected to a "typical" paring of cells, will yield a plot very much like that exemplified in FIG. 2. There will be a high density of pairs near the 45° diagonal, illustrative of the tendency of neighboring cells to have nearby brightness values.

The invention deals with this problem in two steps:

1. By a systematic procedure to achieve first a more nearly optimal distribution of cell pairs over the triangular area of FIG. 2; and 2. By subdividing the distribution thus achieved into regions, one for each domino type, in a way which tends to minimize the "badness" of fit as previously discussed.

The foregoing two procedures are described as occuring in sequence but it will be apparent that they can overlap in ways that may be described as "interactive", "backtracking", "trial and error", "heuristic", etc. It will be readily understood that the process can be aided by a diagram in the form exemplified in FIG. 2, upon which a judgment can be made as to the effectiveness of the first step, including the unlikely possibility of over-maximizing the average picture cell pair unbalance.

The objective of the first step, for most pictures, is to maximize the average unbalance of picture cell pairs.

This is done by starting in some overall cell pairing, such as that exhibited in FIG. 1A, and by modifying the pairings in subareas so as to increase either the maximum unbalance or the average unbalance of the subarea.

One possibility is alternative pairings. As suggested by FIGS. 4A and 4B, each 2×2 picture cell area could alternatively be designated as two horizontal pairs (rows 1 and 2, columns 2 and 3) or two vertical pairs (rows 1 and 2, columns 4 and 5). It can in general be asserted that for each vertically adjacent pair of horizontal pairs, the alternative pairing should be asserted if it increases the maximum (or the average) unbalance of the subarea.

Similarly, for a 2-high by 3-wide sub-area of picture cells, such as that exhibited in FIG. 1B, there is one alternative set of pairings consisting of a vertical pair on the right and two horizontal pairs on the left (there is still another alternative pairing consisting of three side-by-side vertical pairings).

Thus, one way of seeking an overall optimal set of pairings is to start with some overall set of pairings and search through the picture systematically, attempting to replace local patterns of pairings such as those illustrated above, with other local patterns covering, in each case the same sub-areas but with an increased average unbalance.

An example is given in TABLE II, below, for eight columns and six rows. It will be appreciated that TABLE II represents only the upper left-hand portion of TABLE I.

TABLE II

| rows | \ | \ | \ | columns | \ | \ | \ | \ |
|---|---|---|---|---|---|---|---|---|
| | 1 | 2 | 3 | 4 | 5 | 6 | 7 | 8 |
| 1 | 5.06 | 5.89 | 6.17 | | | | | |
| 2 | 6.72 | 6.17 | 6.17 | | | | | |
| 3 | 4.78 | 6.11 | 7.00 | | | | | |
| 4 | 6.78 | 5.06 | 2.83 | | | | | |
| 5 | | | | | | | | |
| 6 | | | | | | | | |

Consider the alternative vertical tiling for this sub-area and compute its sum of the absolute difference ($\Sigma d$). If the new sum is greater, replace the former tiling by the new one.

Then consider the converse change, i.e. from vertical to horizontal. If this change increases the total difference, it should be adopted. This procedure is summarized in Chart I below: (from columns 2 and 3 of rows 1 and 2)

CHART I:

|  (a)  |  (b)  |
|---|---|
| 5.89  6.17 <br> 6.17  6.17 | 5.88  6.17 <br> 6.17  6.17 |
| $\Sigma d = 0.28 + 0.00 = 0.28$ | $\Sigma d = 0.28 + 0.00 = 0.28$ | where the sequence is followed only when it optimizes the slope. Here form (a), unexceeded by (b), is retained.

Likewise, find and consider the sub-areas two cells wide by three cells high as shown in CHART II, (columns 2 and 3, rows 2,3 and 4) and leave each subarea or replace it by its alternate, whichever has the greatest sum of differences.

CHART II:

| (a) | (b) |
|---|---|
| 6.17  6.17 <br> 6.11  7.00 <br> 5.06  2.83 | 6.17  6.17 <br> 6.11  7.00 <br> 5.06  2.83 |

Where the double headed arrow indicates selection of the form with the greatest difference. Here form (a) is maximum, since $0.06+0.83+2.23=3.12$ for (b) is less than $0.00+1.05+4.17=5.22$ for (a).

Similarly find and consider the sub-areas two cells high by three cells wide as shown in Chart III (columns 1, 2 and 3, rows 1 and 2) and leave each sub-area or replace it by its alternate, whichever has the greatest difference.

CHART III:

| (a) | (b) |
|---|---|
| 5.06  5.89  6.17 <br> 6.72  6.17  6.17 | 5.06  5.89  6.17 <br> 6.72  6.17  6.17 |

Here (a) is maximum since $1.66+0.28+0=1.94$ for (a) is greater than $0.83+0.55+0=1.38$ for (b).

An alternative way is to consider potential pairs (a potential pair of cells is considered to be a pair of two adjacent cells not currently paired). All potential pairs of cells can be listed in order of unbalance, starting with the greatest unbalance. An attempt is then made to find some local re-pairing which realizes the first potential pairing and furthermore increases the average unbalance of the sub-area. If this is possible, the new pairings are established and the list of potential pairs is updated by appropriate addition and removal of entries, and the process is repeated. If the first potential pair cannot be realized by a reasonable amount of effort, then the second potential pair on the list is attempted. The process is continued until no potential pairing on the list can be achieved, considering neighborhoods up to the size and complexity that can be dealt with conveniently, by re-pairing of a local neighborhood in a way that increases average unbalance. The process is guaranteed to terminate because increasing the average unbalance of a sub-area increases the average for the whole picture, whereas there must exist some absolute maximum possible average unbalance for a particular picture.

Once a near optimal distribution of pairing has been established, the second step of the procedure is invoked. This consists of groupings of pairings of picture cells for domino assignments. This can most conveniently be described by considering in sequence various sets of domino kinds which share some common property and which have not been used previously in the process. For example, the dominoes (7-8, 6-9) would be members of a set with an average of 7.5, whereas (5-6, 6-7, 7-8, 8-9) would be in a set with an unbalance of 1. If the 8-9 dominoes have been "used previously" as members of some other set, then the actual "unbalance of 1" set of interest would no longer contain 8-9's.

Figure 3A:
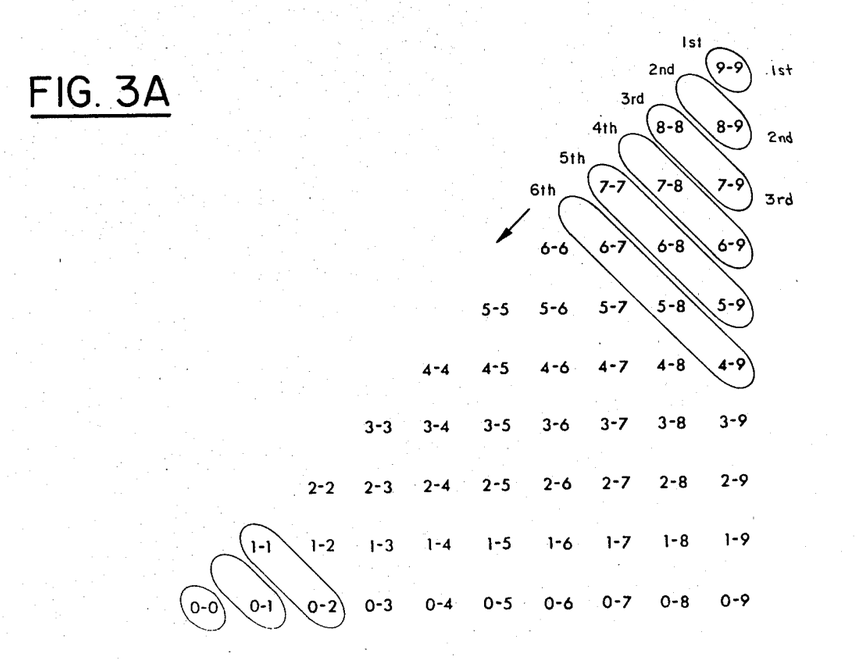
FIG. 3A is a plot showing the assignment of dominoes by considering sets in order of decreasing average, as well as the order of considering sets and the kinds in each set.

Assignment by considering successive sets of domino kinds is demonstrated in FIG. 3A. Consider first the set (9-9) to be assigned to a 22×15 cell picture; there are exactly three 9-9 dominoes in this set. This is the set with the highest average (9.0) and the correct assignment is to the three picture cell pairs having the highest average. The next set of kinds (8-9) is similarly assigned to the next three highest-average picture cell pairs, taking care to orient each domino so as to associate the 9-end with the brightest picture cell. The third set is (7-9, 8-8). These six dominoes are assigned to the next six highest-average picture cell pairs, with the qualification that the three of these with the greatest unbalance are assigned the 7-9's, whereas the three with the least unbalance are assigned the 8-8's. Successive sets of dominoes are thus chosen as indicated by the groupings of FIG. 3A, until finally the three remaining cell pairs (those with least average) are assigned the set with average 0, and the overall assignment is complete. The entire procedure can be carried out in reverse order, starting with the 0-0's and ending with the 9-9's, producing an identical result.

The procedure of FIG. 3A may be summarized as follows:
1. Determine the number of dominoes in the set with the highest (later the next highest, etc.) average.
2. Next determine the number of kinds of dominoes in the set.
3. Identify this number of picture cell pairs—those (which remain uncovered by dominoes) with the highest averages.
4. Divide the identified picture cell pairs into groups of highest unbalance, next highest, etc.
5. Assign the dominoes with the greatest unbalance to picture cells with greatest unbalance, etc.

The set members are summarized in TABLE III below:

TABLE III

| Set Members | Number of Pattern Members |
|---|---|
| 0-0 | 3 |
| 0-1 | 3 |
| 0-2, 1-1 | 6 |
| 0-3, 1-2 | 6 |
| 0-4, 1-3, 2-2 | 9 |
| 0-5, 1-4, 2-3 | 9 |
| 0-6, 1-5, 2-4, 3-3 | 12 |
| 0-7, 1-6, 2-5, 3-4 | 12 |
| 0-8, 1-7, 2-6, 3-5, 4-4 | 15 |
| 0-9, 1-8, 2-7, 3-6, 4-5 | 15 |
| 1-9, 2-8, 3-7, 4-6, 5-5 | 15 |

TABLE III-continued

| Set Members | Number of Pattern Members |
|---|---|
| 2-9, 3-8, 4-7, 5-6 | 12 |
| 3-9, 4-8, 5-7, 6-6 | 12 |
| 4-9, 5-8, 6-7 | 9 |
| 5-9, 6-8, 7-7 | 9 |
| 6-9, 7-8 | 6 |
| 7-9, 8-8 | 6 |
| 8-9 | 3 |
| 9-9 | 3 |

Figure 3B:
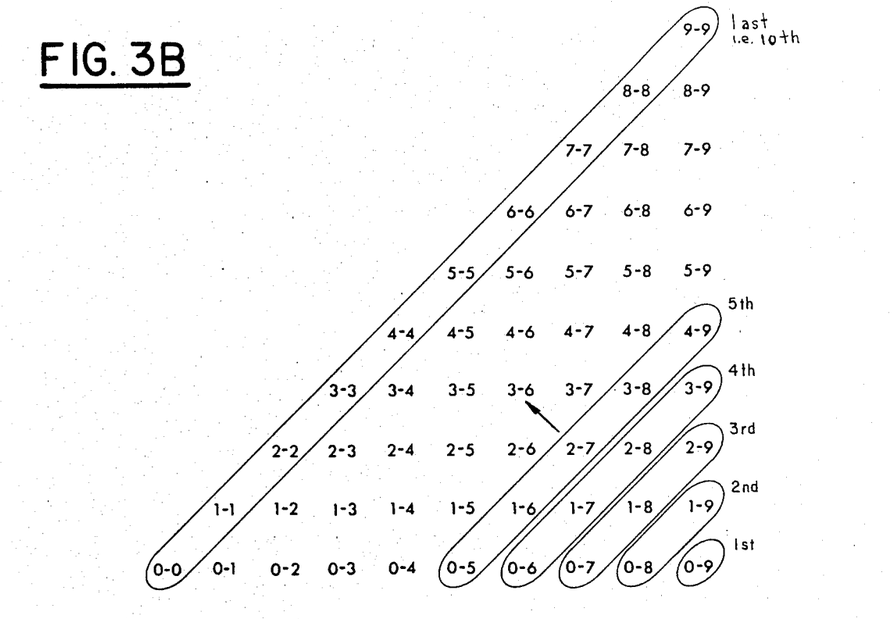
FIG. 3B is a plot showing the assignment of dominoes by considering sets in order of decreasing unbalance, as well as the order of considering sets and the kinds in each set.

Alternatively, but similarly, one could proceed as indicated in FIG. 3B by considering first the set with the greatest unbalance (9), then the next largest (8), etc. By way of example, suppose that the 0-9 set, then the (0-8, 1-9) set have been assigned, and the next step is to assign the (0-7, 1-8, 2-9) set, i.e., the set with unbalance equal to 7. This requires finding the nine unassigned picture cell pairs with greatest unbalance; these will be divided into subsets of three with lowest average, three with intermediate average and three with highest average. To these three sets of three each will be assigned the 0-7, the 1-8 and the 2-9 dominoes respectively. The process is continued in accordance with FIG. 3B until all dominoes have been assigned.

Figure 3C:
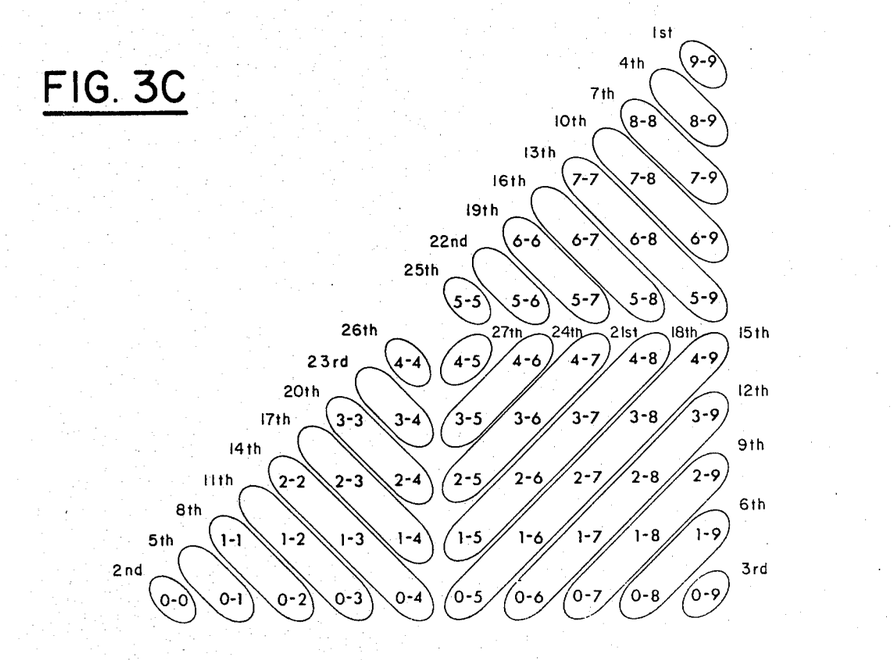
FIG. 3C is a plot showing the assignment of dominoes by a preferred hybrid system, including order of sets and the members of each.

It will be readily understood that the "outlying" dominoes are used systematically from one corner or side of the array of unused dominoes, so as to avoid ending with an unused, isolated set or group remote from the unused picture cell pairs. Here the implied measure of distance is understood in terms of the diagram of FIG. 2. Another, and preferred, procedure is that of FIG. 3C, which proceeds over the regions of domino space from the corners. Still other possible orders of using dominoes for assignment will be evident from the foregoing examples.

Dominoes in accordance with the groupings indicated above are next used to realize the desired design. The result is shown partially in FIG. 4A, with the upper left corner enlarged in FIG. 4B.

Figure 4A:
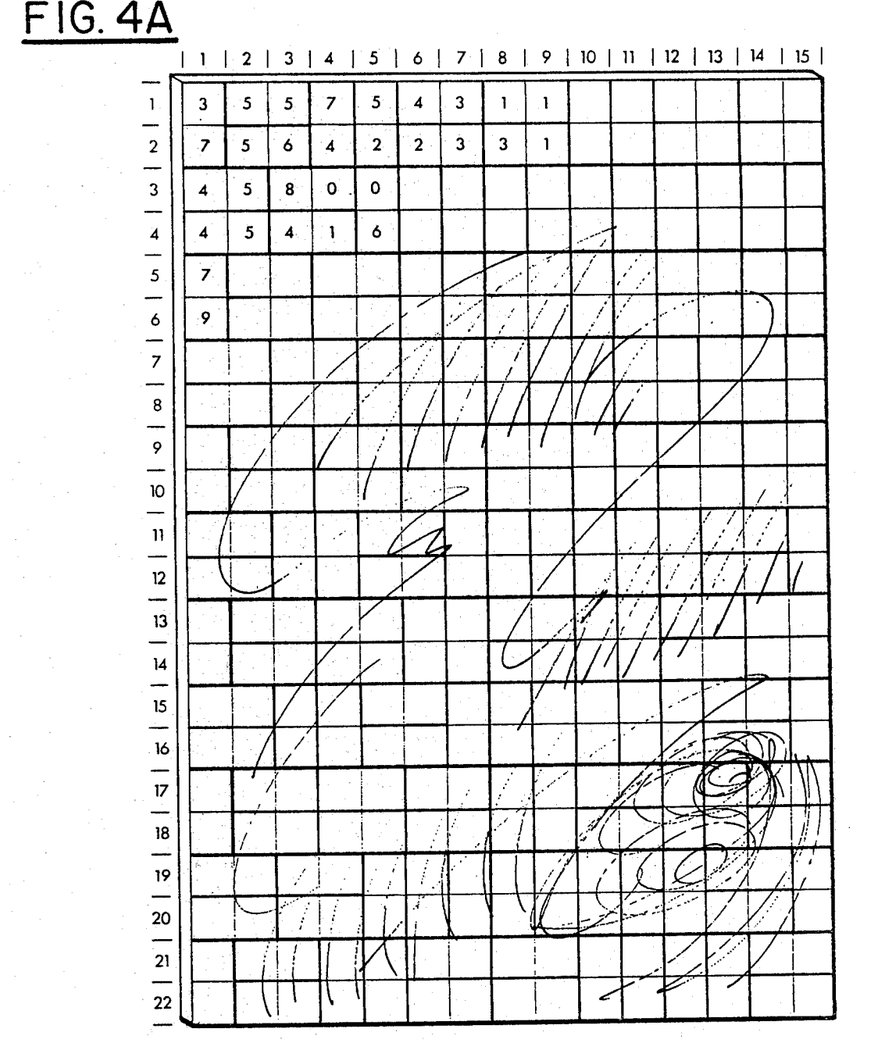
FIG. 4A is a representation of FIG. 1A with substitute values of pattern members in accordance with FIGS 3A through 3C.
Figure 4B:
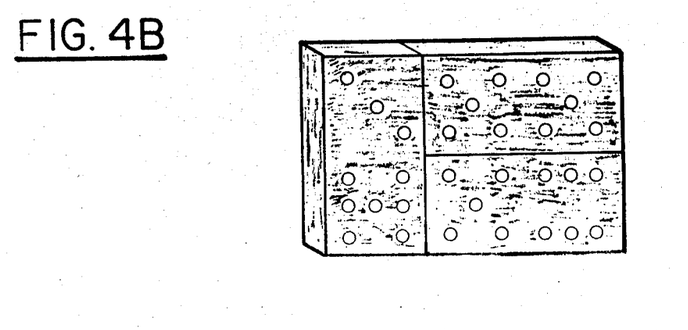
FIG. 4B is an enlarged view of the upper left hand corner of FIG. 5A.

The 330 values for FIG. 4A are set forth in TABLE IV below:

TABLE IV

| rows | \multicolumn{15}{c}{columns} |
|---|---|---|---|---|---|---|---|---|---|---|---|---|---|---|---|

| rows | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 3 | 5 | 5 | 7 | 5 | 4 | 3 | 1 | 1 | 0 | 1 | 0 | 3 | 3 | 9 |
| 2 | 7 | 5 | 6 | 4 | 2 | 2 | 3 | 3 | 1 | 0 | 1 | 1 | 2 | 1 | 7 |
| 3 | 4 | 5 | 8 | 0 | 0 | 2 | 2 | 2 | 2 | 2 | 1 | 1 | 2 | 2 | 4 |
| 4 | 4 | 5 | 4 | 1 | 6 | 7 | 8 | 8 | 9 | 8 | 6 | 5 | 4 | 4 | 3 |
| 5 | 7 | 8 | 0 | 5 | 9 | 8 | 9 | 8 | 7 | 6 | 6 | 5 | 3 | 5 | 4 |
| 6 | 9 | 9 | 0 | 7 | 7 | 9 | 9 | 7 | 9 | 8 | 8 | 9 | 0 | 3 | 4 |
| 7 | 9 | 2 | 3 | 7 | 7 | 9 | 8 | 8 | 9 | 8 | 8 | 8 | 3 | 2 | 2 |
| 8 | 9 | 0 | 3 | 8 | 8 | 6 | 8 | 9 | 9 | 9 | 8 | 8 | 5 | 0 | 2 |
| 9 | 5 | 0 | 5 | 3 | 9 | 9 | 9 | 7 | 4 | 5 | 6 | 8 | 3 | 1 | 1 |
| 10 | 9 | 1 | 4 | 2 | 7 | 9 | 6 | 3 | 6 | 8 | 8 | 9 | 4 | 0 | 4 |
| 11 | 9 | 2 | 4 | 2 | 1 | 9 | 7 | 4 | 5 | 4 | 9 | 7 | 7 | 0 | 9 |
| 12 | 6 | 5 | 3 | 6 | 4 | 8 | 6 | 8 | 8 | 9 | 7 | 7 | 7 | 0 | 3 |
| 13 | 3 | 8 | 1 | 6 | 6 | 6 | 7 | 5 | 9 | 8 | 9 | 7 | 4 | 1 | 7 |
| 14 | 3 | 9 | 1 | 6 | 7 | 6 | 5 | 6 | 7 | 7 | 6 | 7 | 3 | 1 | 7 |
| 15 | 1 | 9 | 3 | 6 | 2 | 2 | 5 | 7 | 8 | 8 | 9 | 6 | 5 | 3 | 2 |
| 16 | 1 | 8 | 6 | 2 | 1 | 2 | 1 | 0 | 4 | 5 | 4 | 4 | 4 | 4 | 2 |
| 17 | 2 | 7 | 7 | 3 | 3 | 4 | 5 | 4 | 5 | 5 | 5 | 6 | 3 | 5 | 2 |
| 18 | 1 | 8 | 3 | 2 | 5 | 2 | 7 | 6 | 6 | 6 | 4 | 1 | 1 | 8 | 1 |
| 19 | 0 | 8 | 3 | 1 | 1 | 2 | 2 | 4 | 4 | 3 | 1 | 1 | 3 | 6 | 3 |
| 20 | 1 | 5 | 5 | 0 | 0 | 0 | 0 | 0 | 0 | 0 | 0 | 4 | 5 | 7 | 2 |
| 21 | 4 | 3 | 3 | 0 | 0 | 0 | 0 | 0 | 1 | 5 | 7 | 6 | 6 | 2 |  |
| 22 | 2 | 0 | 6 | 6 | 2 | 1 | 0 | 0 | 3 | 6 | 5 | 5 | 6 | 4 | 4 |

Figure 5A:
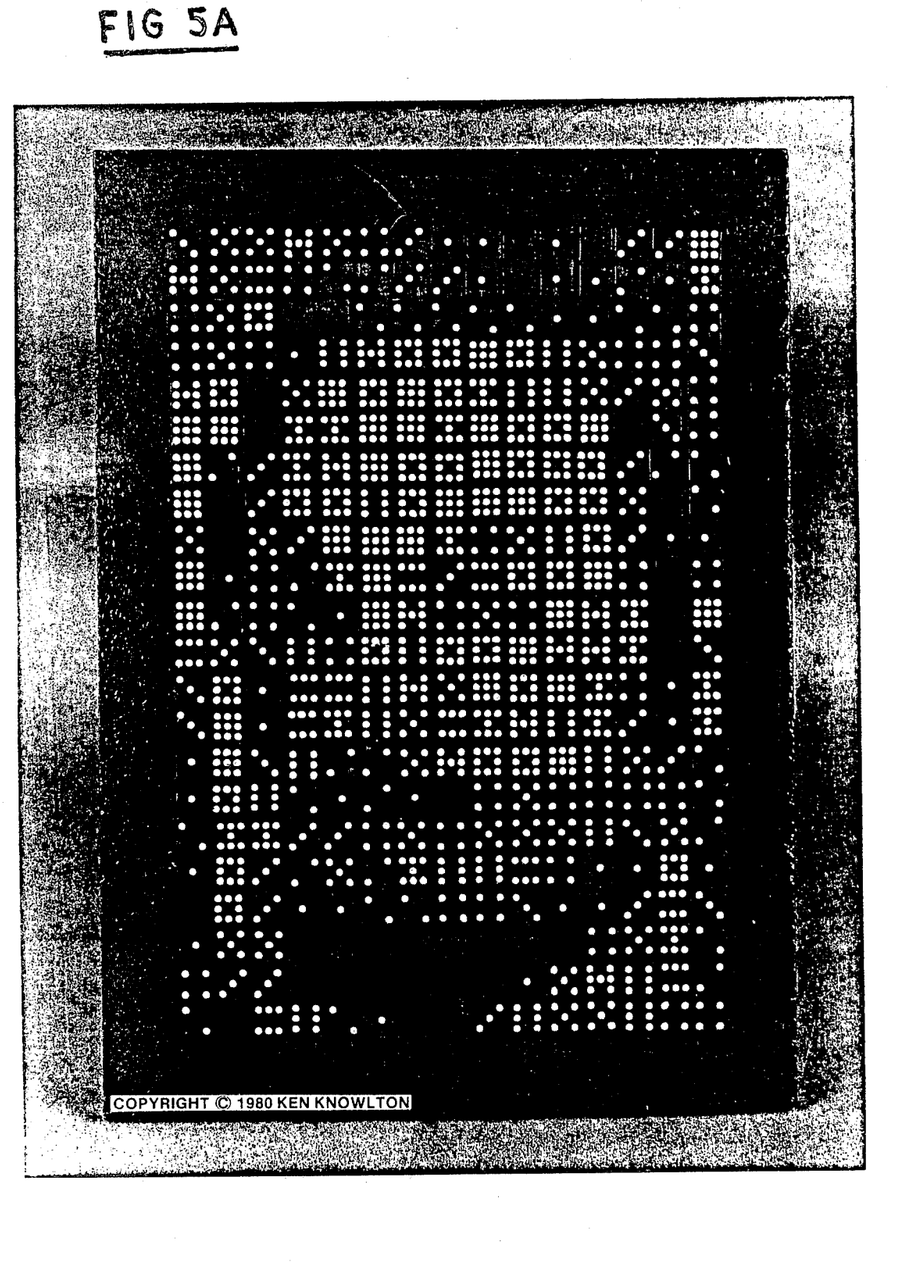
FIG. 5A is the resultant representation of a photograph using three sets of double-nine domino pattern members in accordance with FIG. 4A.
Figure 5B:
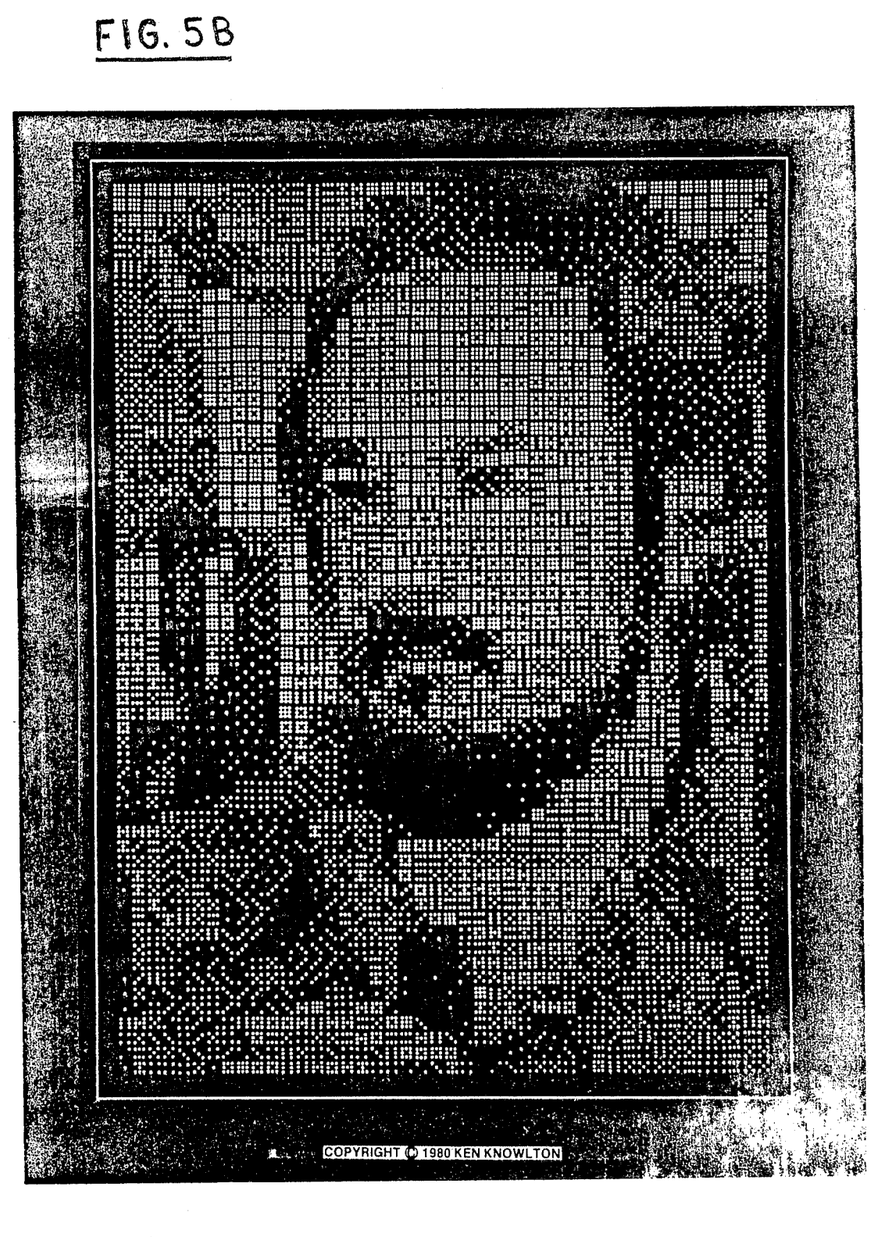
FIG. 5B is the resultant representation of a photograph using twenty-four sets of double-nine dominoes.

The complete mapping is shown in FIG. 5A. The same original picture could alternatively be represented by 2,640 picture elements and ultimately represented by 1,320 dominoes (24 complete double-nine sets) as shown in FIG. 5B.

When the value of each picture element is originally selected on a scale of from 0 to 36, with 0 indicating total darkness, 36 indicating white, the 330 values of FIG. 1A become as set forth in TABLE V below.

TABLE V

| rows | columns |  |  |  |  |  |  |  |  |  |  |  |  |  |  |
|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 |
| 1 | 20 | 23 | 24 | 28 | 22 | 16 | 10 | 6 | 3 | 0 | 0 | 1 | 10 | 20 | 36 |
| 2 | 26 | 24 | 24 | 21 | 9 | 9 | 10 | 10 | 4 | 1 | 4 | 4 | 7 | 7 | 27 |
| 3 | 19 | 24 | 27 | 6 | 6 | 15 | 14 | 14 | 15 | 14 | 4 | 7 | 10 | 8 | 15 |
| 4 | 19 | 20 | 12 | 3 | 19 | 29 | 31 | 33 | 34 | 33 | 24 | 15 | 13 | 14 | 14 |
| 5 | 32 | 32 | 4 | 26 | 43 | 33 | 34 | 33 | 31 | 29 | 29 | 22 | 14 | 21 | 20 |
| 6 | 36 | 33 | 7 | 29 | 31 | 36 | 36 | 33 | 35 | 32 | 32 | 33 | 9 | 14 | 17 |
| 7 | 34 | 17 | 16 | 29 | 30 | 34 | 34 | 33 | 35 | 34 | 32 | 34 | 11 | 6 | 8 |
| 8 | 34 | 5 | 20 | 29 | 34 | 30 | 33 | 35 | 35 | 34 | 32 | 34 | 14 | 4 | 6 |
| 9 | 28 | 0 | 15 | 22 | 33 | 36 | 33 | 27 | 31 | 27 | 29 | 32 | 19 | 5 | 4 |
| 10 | 34 | 3 | 13 | 16 | 25 | 34 | 29 | 17 | 24 | 30 | 32 | 31 | 26 | 3 | 12 |
| 11 | 36 | 12 | 13 | 8 | 14 | 33 | 29 | 22 | 26 | 26 | 36 | 30 | 26 | 9 | 31 |
| 12 | 28 | 22 | 13 | 24 | 24 | 32 | 28 | 31 | 30 | 30 | 30 | 29 | 27 | 1 | 22 |
| 13 | 13 | 33 | 9 | 27 | 28 | 38 | 28 | 28 | 32 | 33 | 34 | 28 | 21 | 7 | 27 |
| 14 | 11 | 36 | 9 | 27 | 30 | 27 | 23 | 27 | 29 | 31 | 30 | 28 | 18 | 6 | 27 |
| 15 | 11 | 35 | 15 | 25 | 6 | 9 | 16 | 26 | 30 | 30 | 31 | 26 | 23 | 13 | 7 |
| 16 | 10 | 32 | 24 | 13 | 3 | 8 | 8 | 2 | 22 | 27 | 25 | 21 | 20 | 16 | 8 |
| 17 | 7 | 32 | 30 | 10 | 12 | 19 | 23 | 23 | 21 | 24 | 23 | 22 | 11 | 23 | 8 |
| 18 | 4 | 32 | 18 | 7 | 20 | 10 | 28 | 26 | 26 | 26 | 21 | 5 | 3 | 28 | 10 |
| 19 | 4 | 28 | 10 | 3 | 3 | 9 | 10 | 14 | 14 | 9 | 3 | 3 | 18 | 26 | 12 |
| 20 | 5 | 17 | 16 | 3 | 0 | 0 | 0 | 1 | 1 | 2 | 1 | 13 | 25 | 30 | 5 |
| 21 | 16 | 13 | 12 | 5 | 0 | 0 | 0 | 0 | 1 | 3 | 22 | 30 | 27 | 24 | 7 |
| 22 | 9 | 4 | 21 | 19 | 9 | 2 | 0 | 1 | 10 | 25 | 25 | 25 | 25 | 18 | 14 |

It again is possible to coordinate paired elements of TABLE V with the dominoes directly, but it is preferable to enhance the coordination before doing so.

It should be clear that generalization of the above procedure pertains to different sizes of pictures, different numbers of sets of dominoes, and different kinds of domino sets, e.g. double six and double 12.

Other familiar objects may be used to represent picture cells, for example dice which have different numbers of spots on their facets.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. The method of representing a design by pattern members in the form of whole dominoes, each having two approximately square halves, which comprises the steps of:
   (1) subdividing the design into a plurality of subordinate areas;
   (2) assigning a value to each subordinate area in accordance with a prescribed characteristic;
   (3) coordinating the assigned values with values of the pattern members, including the evaluation of the pattern members in terms of groups of the sub-areas, which are evaluated in terms of a plurality of horizontal and vertical pairs, with a final pairing assignment made in accordance with the evaluation that enhances unbalance given by the numerical magnitudes of the difference of values of each pair of sub-areas and the pairing of sub-areas for producing maximal unblances are assigned to selective ones of the pattern members; and
   (4) substituting the coordinated pattern members for the sub-areas; thereby to form a patterned representation of said design.

2. The method of claim 1 wherein said prescribed characteristic is brightness.

3. The method of claim 2 wherein said design has a number of original brightness levels exceeding the maximum number of any pattern member.

4. The method of claim 1 wherein the design is created using a multiplicity of complete sets of dominoes.

5. The method of claim 1 wherein each pattern member has a face which is either blank or bears on or more spots thereon.

6. The method of claim 5 wherein the spots are of equal size.

7. The method of claim 6 wherein the spots are arranged in a regular pattern.

8. The method of claim 7 wherein the face is of a first background color and the spots are of a different color having a greater brightness level.

9. The method of claim 8 wherein the background color is black and the spot color is white.

10. The method of claim 5 wherein each member has two adjoining faces.

11. The method of claim 10 wherein the adjoining faces are the same size.

* * * * *